Dec. 29, 1925.  
R. D. ROBISON ET AL  
CHANGEABLE EXHIBITOR  
Filed July 10, 1922  2 Sheets-Sheet 1
1,567,466
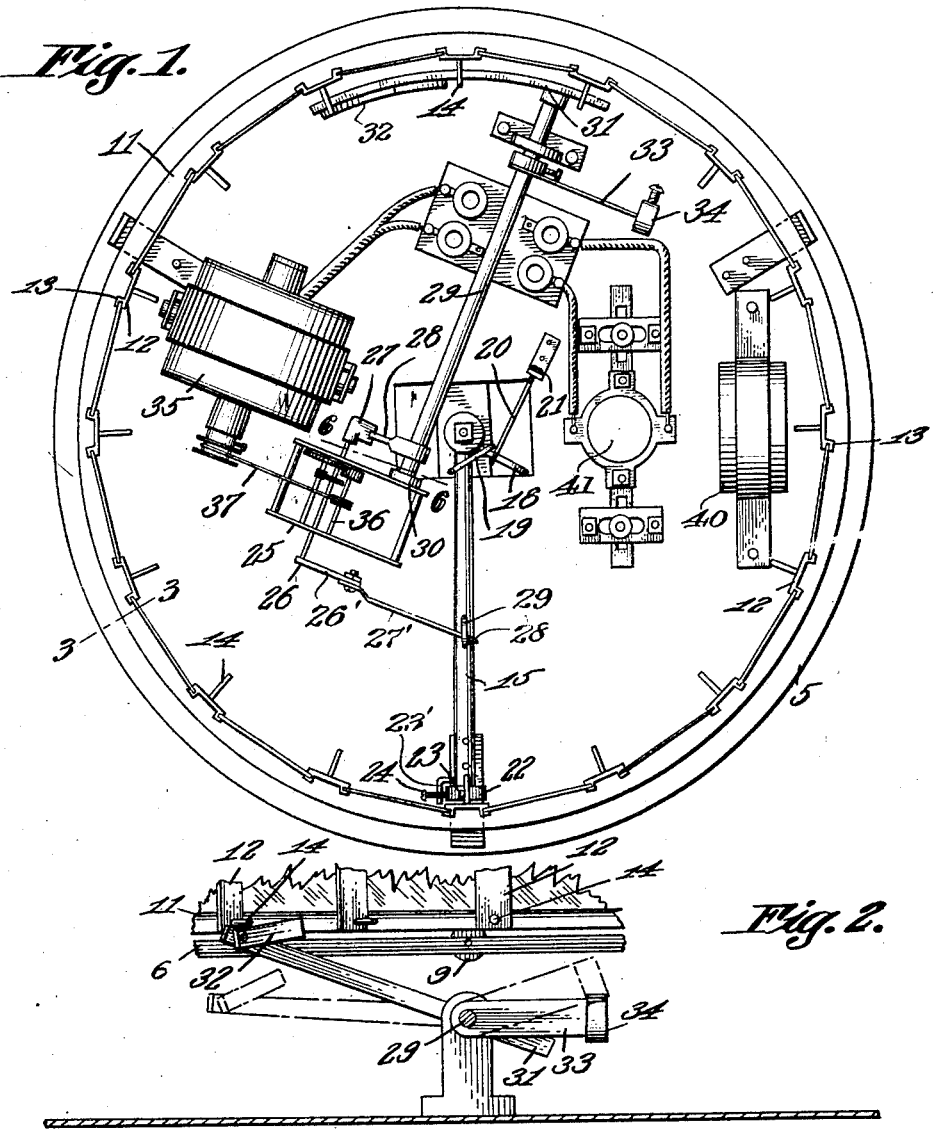
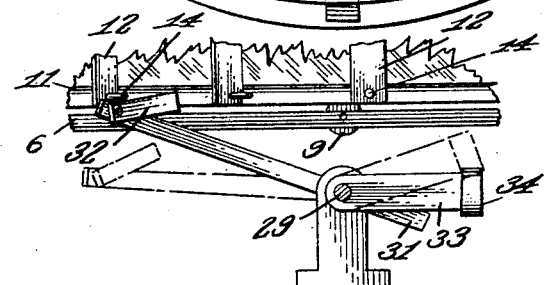
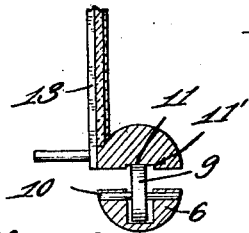
R. D. Robison
R. J. Christman and
G. E. Swigart, Inventor
By C. A. Snow & Co.
Attorney Dec. 29, 1925. 1,567,466
R. D. ROBISON ET AL
CHANGEABLE EXHIBITOR
Filed July 10, 1922 2 Sheets-Sheet 2

R.D.Robison
R.J.Christman  Inventor
G.E.Swigart

By C.A.Snow&Co.
Attorney

Patented Dec. 29, 1925.

1,567,466

UNITED STATES PATENT OFFICE.

RAY D. ROBISON, ROLLAND J. CHRISTMAN, AND GROVER E. SWIGART, OF BRYAN, OHIO.

CHANGEABLE EXHIBITOR.

Application filed July 10, 1922. Serial No. 573,824.

*To all whom it may concern:*

Be it known that we, RAY D. ROBISON, ROLLAND J. CHRISTMAN, and GROVER E. SWIGART, citizens of the United States, residing at Bryan, in the county of Williams, State of Ohio, have invented a new and useful Changeable Exhibitor, of which the following is a specification.

This invention relates to changeable exhibitors and more particularly to an exhibitor designed for successively moving plates before a projecting lens to display the matter contained on the plates.

The primary object of the invention is to provide novel means for moving the supporting member at predetermined intervals, the movements of the supporting member being equal to the widths of the plates to insure the proper positioning of the plates before the projecting lens.

Another object of the invention is to provide means for restricting movement of the supporting member, the means operating to stop the supporting member at predetermined intervals.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a changeable exhibitor constructed in accordance with the present invention.

Figure 2 is an enlarged fragmental elevational view of the stop mechanisms.

Figure 3 is a sectional view taken on line 3—3 of Figure 1.

Figure 4:
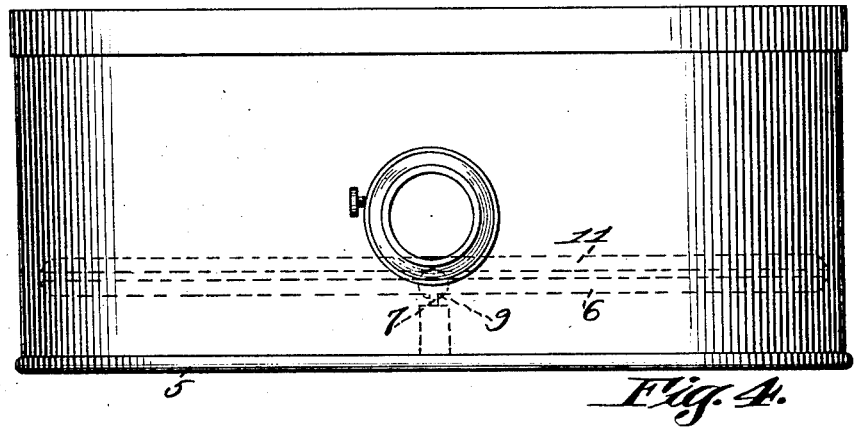
Figure 4 is a front elevational view of the device or casing in which the carriage is positioned.
Figure 5:
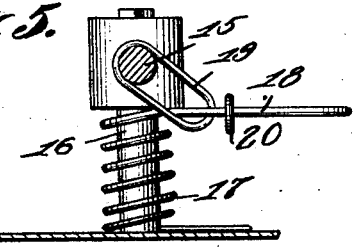
Figure 5 is an enlarged detail view disclosing the connection between the coiled spring and operating arm.
Figure 6:
Figure 6 is a sectional view taken on line 6—6 of Figure 1.

Referring to the drawings in detail, the reference character 5 designates the base of the device, which is preferably circular in formation. This base provides a support for the circular stationary section 6 on which the support moves.

This section 6 is supported in spaced relation with the base as by means of the arms 7, which arms are secured to the member 6 in suitable spaced relation with each other. A groove 8 is formed in the upper surface of the section 6 in which groove operate the rollers 9, the rollers 9 operating on pintles 10, that connect the side members formed by the groove. The carriage 11 is also circular in formation and is formed with a groove 11' in the undersurface thereof, which groove accommodates the rollers 9 to support the carriage.

Vertical plate supporting members 12 are carried by the upper section or carriage 11, each of which plate supporting members including opposed grooved bars 13, the grooves accommodating the side edges of the slides positioned therein. As shown, these plate supporting members are arranged in spaced relation with each other, the spaces between the plate supporting members being equal to the width of the plates supported therein, so that the plates will be properly held on the carriage, but permitted to be readily and easily removed for replacement.

Carried by each of the plate supporting members 12 is an inwardly extending pin 14, which pins cooperate with the operating arm 15 to accomplish the rotation of the carriage. This operating arm is relatively long and has its inner end pivotally supported on the vertical shaft 16, which is disposed centrally of the base 5. A coiled spring indicated at 17 has one end thereof secured against movement, the intermediate portion being coiled around the shaft 16, while the opposite end thereof, extends laterally as at 18. This end 18 of the coiled spring has connection with the operating arm 15, as through the medium of the link 19 so that movement of the end 18 of the spring will act to move the operating arm 15 forwardly to move the carriage 11 a predetermined distance.

If it is desired to adjust the tension of the spring 17, the rod 20, which has connection with the end 18 of the spring, may be shortened by moving the nut 21, disposed on the threaded end of the rod 20.

Figure 7:
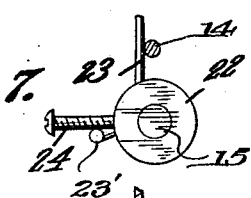
Figure 7 is an enlarged detail view of the movable finger and head carried at the outer end of the operating arm.
Figure 8:
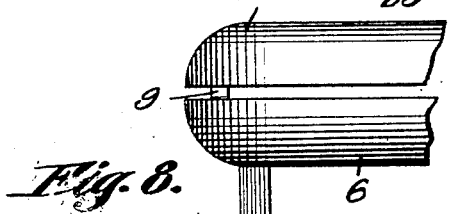
Figure 8 is an enlarged fragmental detail view of one portion of the carriage.
Figure 9:
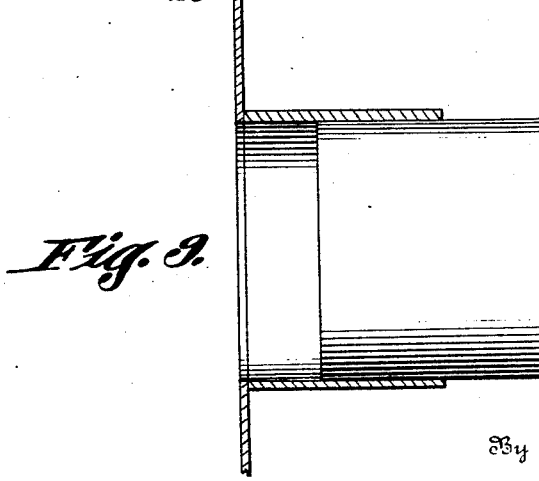
Figure 9 is a fragmental view disclosing the lens supporting tube.

On the outer end of the operating arm 15 is a head 22 that carries a pin 23, the head being supported however to rotate in the direction of the arrow as shown by Figure 7 of the drawings, but prevented from rotating in the opposite direction, to the end that the pin 23 may move past a pin 14 of the carriage, when the arm 15 is moved in one direction, but contact with the pins to move the carriage a predetermined distance, when the arm 15 is moved in the opposite direction. The screw 24 contacts with finger 23' to prevent reverse movement of the head 22 when the pin 23 is engaging a pin 14 to move the carriage. The adjusting screw 24 is positioned in the head 22 and acts as a weight to overbalance the head 22 and return the pin 23 to its normal upright position when the pin 23 has been moved to a position to contact with a pin 14, in a manner to move the carriage 11 to display another slide.

Supported by the base 5 is a frame 25 which supports the gearing for operating the shaft 26, which shaft carries an extension 27 at one end thereof, which extension is adapted to engage the finger 28 carried by the shaft 29, that has one end thereof positioned in the bearing 30 supported by the frame 25.

Secured to one end of the shaft 26 is an arm 26' that has pivotal connection with the arm 27' which is formed with a hook 28' positioned around a portion of the arm 15 and secured against lateral movement by means of the eye bolt 29' carried by the arm 15.

Thus it will be seen that as the arm 26' is rotated, the arm 15 will be oscillated to accomplish the purpose of the invention.

The opposite end of the shaft 29 supports an arm 31 that carries a forwardly extended arm 32, the arm 32 being designed to frictionally contact with the pins 14 to retard the movement of the carriage 11, and act as a brake to stop the carriage at predetermined intervals.

An arm 33 is secured to the shaft 29, on which arm is supported an adjustable weight 34, the arm and weight acting to return the shaft 29 to its normal position after the same has been moved by the member 27.

A motor indicated at 35 has connection with the shaft 36 of the gearing as by means of the belt 37, whereby movement of the motor is imparted to the shafts 29 and 15 simultaneously.

A suitable condenser is indicated at 40 and is illuminated by means of the electric lamp 41 positioned at the rear thereof.

Having thus described the invention, what is claimed as new is:—

A changeable exhibitor including a base, a rotatable plate supporting carriage mounted on the base, inwardly extended pins arranged adjacent to the lower edges of the plates supported by the carriage, an operating mechanism including a rotatable arm, an arm pivotally connected with the first mentioned arm and having a hook portion formed at one end thereof, a pivoted arm, said hook portion of the first mentioned pivoted arm adapted to embrace a portion of the last mentioned arm to move the last mentioned arm in one direction, means for returning the arm to its initial position, and a pivoted member at the outer end of the second mentioned pivoted arm for engaging the pins to move the rotatable plate supporting carriage.

In testimony that we claim the foregoing as our own, we have hereto affixed our signatures.

RAY D. ROBISON.
ROLLAND J. CHRISTMAN.
GROVER E. SWIGART.